2,696,457
Patented Dec. 7, 1954

2,696,457

PROCESS FOR PRODUCING PATULIN

Marjorie A. Darken, Allendale, and Newell O. Sjolander, Princeton, N. J., assignors, by mesne assignments, to American Cyanamid Company, New York, N. Y., a corporation of Maine No Drawing. Application April 15, 1952,
Serial No. 282,466

7 Claims. (Cl. 195—36)

This invention relates to an antibiotic material, and more specifically to a new and improved method for producing patulin in a substantially high yield within a comparatively short period of time.

Patulin is an antibiotic substance which has been referred to in the literature by various investigators as clavacin, clavatin, claviformin, peniciden and expansine. Its chemical structure can be represented as follows:

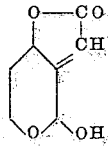

(Woodward et al., J. A. C. S. 71, 758 (1949)). This material possesses an antibacterial effect against gram-negative as well as gram-positive pathogenic bacteria, such as for example, Staphylococcus aureus, Escherichia coli, Pseudomonas aeruginosa, Eberthella typhosa, Salmonella typhi-murium, Salmonella paratyphi, Shigella alkalescens, and Proteus vulgaris. Patulin is likewise highly effective as an anti-fungal agent against certain disease-producing fungi infecting man, animals and plants.

A conventional method for the production of this antibiotic involves inoculating a medium such as Czapek-Dox consisting of glucose, sodium nitrate, potassium dihydrogen phosphate, potassium chloride, magnesium sulphate, ferrous sulphate, and distilled water with a spore suspension of a mold such as Penicillium urticae, and incubating this inoculated medium. The maximum amount of patulin produced by this process after a period of about ten days was approximately 0.25 mg./ml.

By the practice of this invention, the yields of patulin have been substantially increased within a relatively short period of time as compared with other processes. Thus, under comparative conditions, the yield of patulin has been increased from ten to twenty times the amounts produced hitherto. This range is, of course, illustrative and lesser or greater yields are within the contemplation of the invention depending upon the conditions under which the antibiotic material is produced. A practical process is herein provided for the large scale manufacture of patulin in high yields within a comparatively short period of time.

This invention comprises producing patulin in high yields by subjecting an aqueous medium containing an assimilable nitrogen source, an assimilable carbon source, and a buffering agent selected from the group consisting of phthalic acid or alkali metal salts or alkaline earth metal salts of this acid such as for example, potassium acid phthalate, sodium acid phthalate, calcium acid phthalate, etc., to the action of a patulin-producing organism such as Aspergillus clavatus and Penicillium urticae under submerged conditions employing aeration or aeration and agitation. Under these conditions, a luxuriant growth of the micro-organism is achieved much more rapidly than in procedures used hitherto, and the organism grows homogenously throughout the body of the liquid medium. Furthermore, the rate of patulin formation is markedly accelerated under the process conditions of this invention and maximum patulin formation is attained within a considerably shorter period of time as compared with conventional procedures (5 days as compared with 8 to 10 days).

As assimilable carbon sources, carbohydrates of the class known as polysaccharides which comprises those carbohydrates containing more than one monosaccharide unit per molecule, are admirably suited for this purpose since they are reacted upon solely by the fungus or fungus enzymes to yield assimilable sugar, yet are sufficiently resistant to such fungus or enzyme action as to persist in the nutrient medium in considerable quantity throughout the course of the incubation thereby providing a reservoir for the nutrition of the fungus. The maintenance of such a condition of nutrition is very favorable to the obtaining of high yields of patulin.

Monosaccharides such as glucose, fructose, and arabinose, are likewise suitable carbon sources for the purpose of this invention, even though they are more rapidly assimilated than the polysaccharides. The assimilable carbon sources may be added to the nutrient medium either in solid form or in aqueous solution. For the purposes of this invention, it is preferred however, to use glucose as an essential part of the nutrient medium in an amount varying between 2–7% by weight of the medium and preferably, in an amount of about 5%.

A wide variety of proteinaceous material is effective in favoring patulin production. Proteinaceous material is here understood to include unmodified protein and protein degradation products, particularly such products as arise from the hydrolysis of the protein. These protein degradation products include proteoses, peptones, polypeptides, peptides and amino acids. Natural raw materials such as corn steep liquor, wheat steeping liquor, acid-hydrolyzed casein, enzyme-hydrolyzed casein, whey or whey concentrates, soy bean meal, and distillers grain slops can be used. These proteinaceous materials need not be supplied in a high degree of purity; the less pure materials which carry traces of growth factors and considerable quantities of mineral nutrients are also suitable for use. The use of corn steep liquor is especially advantageous since it is a cheap, readily available by-product of the corn wet-milling industries of this country. Corn steep liquor, supplied to the trade as the concentrated (27° to 32° Bé.) product, has the approximate analysis: moisture 40–50%, proteins and protein hydrolysis products 22–27%, carbohydrates, 1–10%, and ash 8–12%. The corn steep liquor is present in the medium in amounts ranging from 0.05% to 3.0% by weight (dry basis) of the medium, and preferably in an amount of about 0.1%.

The presence of the nitrate ion in the nutrient medium is essential for good patulin production. Sodium nitrate, as previously used, is a suitable source of nitrate ion. It has been found that in addition, other nitrates of the alkali and alkaline earth metals such as potassium, calcium and magnesium may be used for this purpose.

As indicated supra, another essential element of the medium is the buffering agent which comprises a substance selected from the group consisting of phthalic acid and alkali metal salts and alkaline earth metal salts of phthalic acid. While equivalent results can be obtained by the use of any member of the aforementioned group, it is preferred for practical reasons, to use potassium acid phthalate. Any of these buffers can be used in amounts varying from 0.1% to 2.0% by weight of the medium, 0.5% being preferred.

The process set forth herein for the production of patulin is that ordinarily referred to as submerged or deep culture. The submerged culture process involves the growth of the mold in an aqueous medium and accompanied customarily by agitation. When the submerged culture process is carried out in small vessels such as flasks of relatively small capacity, the process is frequently referred to as the "shake" culture process, because the agitation is brought about by continuously shaking the culture by suitable mechanical means. When containers of larger capacity are employed, the agitation of the liquid nutrient material is ordinarily accomplished in part by mechanical stirring and in part by aeration, which latter functions primarily to supply oxygen for the growth of the mold.

The culture medium containing the mold should be maintained at a suitable temperature for example in a range of 20°–30° C. A range of temperature which has been found to be particularly suitable varies from 23° to 28° C. The period of time during which the mold is grown will depend upon the objective desired. Thus, the mold may be grown only up to the period of its maximum rate of growth. Under such conditions, the mold growth may be interrupted after a period of growth of from two to three days. On the other hand, the mold may be grown to obtain the maximum yield of patulin. In such cases, the mold may be grown for a longer period, for example about four or six days.

When the patulin-producing organisms are propagated in submerged culture, subjected to aeration and agitation in a suitable nutrient medium and at a suitable temperature, a rapid production of considerably larger quantities of patulin than have been obtained in the prior art is effected. Thus, as much as 2 mg./ml. of patulin is obtained in five days when the fermentation is conducted in accordance with this invention, whereas only about 0.1 mg./ml. has been obtained by conventional methods after a period of about eight to ten days.

The success of this method is attributable in part to the fact that the regular Czapek-Dox medium used hitherto is supplemented by the addition of proteinaceous material such as for example corn steep liquor, wheat steeping liquor, soy bean meal, distillers grain slops, etc., and likewise the addition of a substance selected from the group consisting of phthalic acid, and alkali and alkaline earth metal salts of this acid. The addition of proteinaceous material serves as a sustained source of energy or nutrition for the fungus throughout substantially the entire fermentation period. The addition of a buffering agent of the proper pH range tends to maintain the pH of the culture medium in a fairly constant range over the entire period of patulin production, thereby tending to prevent a substantial increase in alkalinity of the fermentation medium. Thus, greater uniformity in pH during the growing period is maintained, thereby avoiding the development of high pH values during the fermentation.

The patulin may be separated from the culture medium in any suitable manner. For example, the antibiotic material may be adsorbed on a surface-active carbon, followed by elution with a suitable solvent such as for example, ethyl acetate, methyl acetate, acetone, etc. By well-known extractive procedures, the patulin may be subsequently isolated in dry form.

Additional advantages and features of this new and highly improved method are set forth in the following examples which disclose the principles of the invention and the preferred embodiments of applying those principles. It is understood, however, that these examples are merely illustrative and not limitative in nature, being capable of various other modifications.

Example I

A medium was prepared containing:

| | |
|---|---|
| $KHC_8H_4O_4$ | 10 g./l. |
| Glucose | 40 g./l. |
| Corn steep liquor | 1.0 g./l. (dry basis) |
| $NaNO_3$ | 3.0 g./l. |
| $KH_2PO_4$ | 1.0 g./l. |
| KCl | 0.5 g./l. |
| $MgSO_4.7H_2O$ | 0.5 g./l. |
| $FeSO_4.4H_2O$ | 0.01 g./l. |

This medium was distributed into Erlenmeyer flasks which were autoclaved at 121° C. for twenty minutes, cooled and inoculated with 5% 48-hour mycelial inoculum of *Aspergillus clavatus* NRRL No. 1980 and *Penicillium urticae* NRRL No. 1953. The inoculum medium consisted of:

| | |
|---|---|
| Corn steep liquor | 10 g./l. (dry basis) |
| Soluble malt sugars and dextrims | 30 g./l. |
| Yeast extract | 1.5 g./l. |
| $NaNO_3$ | 3.0 g./l. |
| $KH_2PO_4$ | 0.50 g./l. |
| $MgSO_4.7H_2O$ | 0.25 g./l. |
| $CaCO_3$ | 1.50 g./l. |

Flasks were placed on a reciprocating shaker and incubated at 25°–26° C. The results are as follows:

*Aspergillus clavatus*—2.100 mg./ml.—maximum patulin production on the fifth day.
*Penicillium urticae*—1.000 mg./ml.—maximum patulin production on the fifth day.

Example II

A regular Czapek-Dox medium was used instead of the medium described in Example I. The same procedure was used, however, as that set forth in Example I. The results are as follows:

*Aspergillus clavatus*—0.100 mg./ml.—maximum patulin production on the fifth day.
*Penicillium urticae*—0.115 mg./ml.—maximum patulin production on the fifth day.

Example III

A 25-gallon tank containing a 15-gallon charge of the fermentation medium described in Example I except that the quantity of glucose was increased to 50 g./l. and the volume of potassium acid phthalate was reduced to 5 g./l. was inoculated with 3% of a 2-day shaker flask mycelial inoculum of *Penicillium urticae* NRRL No. 1953. An aeration rate of one volume of air per volume of medium per minute was maintained. An agitation rate of 160 R. P. M. was employed. Defoamer was added as needed, and the batch was incubated at 76° F. until the maximum patulin titre developed. A potency of 2.3 mg./ml. was obtained in 86 hours.

It is apparent from the foregoing that the invention is capable of various modifications and that it is intended and desired therefore to embrace within the scope of this invention such variations and changes that are necessary to adapt it to varying conditions and uses as defined by the scope of the appended claims.

We claim:
1. The process for the production of patulin in high yields which comprises fermenting under submerged aeration a patulin-producing organism in an aqueous culture medium, the organism being selected from the group consisting of *Aspergillus clavatus* and *Penicillium urticae*, and the culture medium containing an assimilable nitrogen source, an assimilable carbon source, and a buffering agent selected from the group consisting of phthalic acid, an alkali metal salt of phthalic acid, and an alkaline earth metal salt of phthalic acid, said buffering agent being present in an amount varying between 0.1 to 2% by weight of the culture medium.

2. The process for the production of patulin in high yields which comprises fermenting under submerged aeration a patulin-producing organism in an aqueous culture medium, the organism being selected from the group consisting of *Aspergillus clavatus* and *Penicillium urticae*, and the culture medium containing an assimilable nitrogen source, an assimilable carbon source, and a buffering agent selected from the group consisting of phthalic acid, an alkali metal salt of phthalic acid, and an alkaline earth metal salt of phthalic acid, said buffering agent being present in an amount equal to about 0.5% by weight of the culture medium.

3. The process for the production of patulin in high yields which comprises fermenting under submerged aeration a patulin-producing organism in an aqueous culture medium, the organism being selected from the group consisting of *Aspergillus clavatus* and *Penicillium urticae*, and the culture medium containing an assimilable nitrogen source, an assimilable carbon source, and potassium acid phthalate in an amount varying between 0.1 to 2% by weight of the culture medium.

4. The process for the production of patulin in high yields which comprises fermenting under submerged aeration a patulin-producing organism in an aqueous culture medium, the organism being selected from the group consisting of *Aspergillus clavatus* and *Penicillium urticae*, and the culture medium containing an assimilable nitrogen source, an assimilable carbon source comprising glucose in an amount ranging between 2 to 7% by weight of the culture medium, and a buffering agent selected from the group consisting of phthalic acid, an alkali metal salt of phthalic acid, and an alkaline earth metal salt of phthalic acid, said buffering agent being present in an amount varying between 0.1 to 2% by weight of the culture medium.

5. The process for the production of patulin in high yields which comprises fermenting under submerged aeration a patulin-producing organism in an aqueous culture medium, the organism being selected from the group consisting of *Aspergillus clavatus* and *Penicillium urticae*, and the culture medium containing an assimilable nitrogen source, an assimilable carbon source, corn steep liquor in an amount ranging from 0.05 to 3% by weight of the culture medium, and a buffering agent selected from the group consisting of phthalic acid, an alkali metal salt of phthalic acid, and an alkaline earth metal salt of phthalic acid, said buffering agent being present in an amount varying between 0.1 to 2% by weight of the culture medium.

6. The process for the production of patulin in high yields which comprises fermenting under submerged aeration a patulin-producing organism in an aqueous culture medium, the organism being selected from the group consisting of *Aspergillus clavatus* and *Penicillium urticae,* and the culture medium containing an assimilable nitrogen source, an assimilable carbon source comprising glucose in an amount ranging between 2 to 7% based on the weight of the culture medium, corn steep liquor in an amount varying between 0.05 to 3% by weight of the culture medium, and a buffering agent selected from the group consisting of phthalic acid, an alkali metal salt of phthalic acid, and an alkaline earth metal salt of phthalic acid, said buffering agent being present in an amount varying between 0.1 to 2% by weight of the culture medium, and continuing the fermentation of the culture medium for a period of from two to six days at a temperature ranging between 20°–30° C.

7. The process for the production of patulin in high yields which comprises fermenting under submerged aeration a patulin-producing organism in an aqueous culture medium, the organism being selected from the group consisting of *Aspergillus clavatus* and *Penicillium urticae*, and the culture medium containing an assimilable nitrogen source, an assimilable carbon source including glucose in an amount equal to about 5% by weight of the culture medium, corn steep liquor in an amount equal to about 0.5% by weight of the culture medium, and potassium acid phthalate in an amount ranging from 0.1 to 2% by weight of the culture medium, and continuing the fermentation for a period of from two to six days at a temperature ranging between 20°–30° C.

References Cited in the file of this patent

UNITED STATES PATENTS

| Number | Name | Date |
|---|---|---|
| 2,417,584 | Birkinshaw | Mar. 18, 1947 |

OTHER REFERENCES

Levine et al.: A Compilation of Culture Media, 1930, page 130.
Britton: Hydrogen Ions, vol. I, 1943, page 321.
Florey et al.: Antibiotics, vol. I, 1949, pages 273–275.
Baron: Handbook of Antibiotics, 1950, pages 100–101.